US010282620B2

(12) United States Patent
Noh et al.

(10) Patent No.: US 10,282,620 B2
(45) Date of Patent: May 7, 2019

(54) SYSTEM AND METHOD FOR PROVIDING SURVEILLANCE DATA

(71) Applicant: Hanwha Techwin Co., Ltd., Changwon-si (KR)

(72) Inventors: Seung In Noh, Changwon-si (KR); Jeong Eun Lim, Changwon-si (KR); Seoung Seon Jeon, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 143 days.

(21) Appl. No.: 15/398,843

(22) Filed: Jan. 5, 2017

(65) Prior Publication Data

US 2018/0025231 A1    Jan. 25, 2018

(30) Foreign Application Priority Data

Jul. 21, 2016    (KR) .................. 10-2016-0092889

(51) Int. Cl.
| | |
|---|---|
| *G06K 9/00* | (2006.01) |
| *G06K 9/46* | (2006.01) |
| *G06K 9/52* | (2006.01) |
| *G06K 9/62* | (2006.01) |

(52) U.S. Cl.
CPC ..... *G06K 9/00771* (2013.01); *G06K 9/00523* (2013.01); *G06K 9/00536* (2013.01); *G06K 9/00718* (2013.01); *G06K 9/00758* (2013.01); *G06K 9/4652* (2013.01); *G06K 9/52* (2013.01); *G06K 9/522* (2013.01); *G06K 9/6201* (2013.01); *G06K 2009/00738* (2013.01)

(58) Field of Classification Search
CPC ....... G06K 2009/00738; G06K 9/6201; G06K 9/522; G06K 9/52; G06K 9/4652; G06K 9/00758; G06K 9/00718; G06K 9/00536; G06K 9/00523; G06K 9/00771
See application file for complete search history.

(56) References Cited

U.S. PATENT DOCUMENTS

| | | | | |
|---|---|---|---|---|
| 6,178,141 B1 * | 1/2001 | Duckworth | ............. | F41H 11/00 367/124 |
| 7,778,006 B2 * | 8/2010 | Stewart | .................... | F42D 1/05 361/248 |
| 9,004,353 B1 * | 4/2015 | Block | ................ | G06Q 20/1085 235/379 |

(Continued)

FOREIGN PATENT DOCUMENTS

| | | |
|---|---|---|
| KR | 10-2006-0073025 A | 6/2006 |
| KR | 10-2010-0105959 A | 10/2010 |

(Continued)

*Primary Examiner* — Mia M Thomas
(74) *Attorney, Agent, or Firm* — Sughrue Mion, PLLC

(57) ABSTRACT

A system and method for providing surveillance data are provided. The system includes: a pattern learner configured to learn a time-based data pattern by analyzing at least one of image data of one or more images and sound data of sound obtained from a surveillance zone at a predetermined time or time period, and to generate an event model based on the time-based data pattern; and an event detector configured to detect at least one event by comparing the event model with a time-based data pattern of at least one of first image data of one or more first images and first sound data of first sound obtained from the surveillance zone.

21 Claims, 6 Drawing Sheets

(56) References Cited

U.S. PATENT DOCUMENTS

| | | | | |
|---|---|---|---|---|
| 9,044,141 B2* | 6/2015 | Behrend | | A61B 3/0008 |
| 9,202,115 B2* | 12/2015 | Park | | G06K 9/00624 |
| 9,449,240 B2* | 9/2016 | Lorenzoni | | G08B 17/125 |
| 9,473,748 B2* | 10/2016 | Elangovan | | G06T 7/20 |
| 9,594,163 B2* | 3/2017 | Park | | G08B 13/1672 |
| 9,626,569 B2* | 4/2017 | Mercier | | G06K 9/00711 |
| 9,953,226 B2* | 4/2018 | Midavaine | | G06K 9/00624 |
| 10,026,285 B2* | 7/2018 | Venetianer | | G08B 13/19615 |
| 2009/0184830 A1* | 7/2009 | Watabe | | G01N 29/024 |
| | | | | 340/628 |
| 2009/0189981 A1* | 7/2009 | Siann | | H04N 7/183 |
| | | | | 348/143 |
| 2014/0306799 A1* | 10/2014 | Ricci | | H04W 4/21 |
| | | | | 340/5.83 |
| 2014/0362302 A1* | 12/2014 | Behrend | | A61B 3/1233 |
| | | | | 349/2 |
| 2015/0005951 A1* | 1/2015 | Srinivasan | | G05B 15/02 |
| | | | | 700/275 |
| 2015/0036882 A1* | 2/2015 | Fan | | G08B 13/196 |
| | | | | 382/103 |
| 2015/0070506 A1* | 3/2015 | Chattopadhyay | | G06K 9/00718 |
| | | | | 348/159 |
| 2015/0242702 A1* | 8/2015 | Aphek | | G06K 9/00771 |
| | | | | 382/113 |
| 2015/0339912 A1* | 11/2015 | Farrand | | G08B 25/001 |
| | | | | 340/501 |
| 2015/0363673 A1* | 12/2015 | Goranson | | G06K 9/726 |
| | | | | 382/103 |
| 2015/0379355 A1* | 12/2015 | Kanga | | G08B 13/19671 |
| | | | | 382/103 |
| 2016/0063314 A1* | 3/2016 | Samet | | G06K 9/00288 |
| | | | | 348/78 |
| 2016/0107749 A1* | 4/2016 | Mucci | | B64C 39/024 |
| | | | | 701/3 |
| 2016/0232399 A1* | 8/2016 | Kempinski | | G06K 9/0061 |
| 2016/0335504 A1* | 11/2016 | Midavaine | | G06K 9/00624 |
| 2018/0025231 A1* | 1/2018 | Noh | | G06K 9/00718 |
| | | | | 382/160 |

FOREIGN PATENT DOCUMENTS

| | | |
|---|---|---|
| KR | 10-2015-0129933 A | 11/2015 |
| KR | 10-2016-0016022 A | 2/2016 |

* cited by examiner

SYSTEM AND METHOD FOR PROVIDING SURVEILLANCE DATA

CROSS-REFERENCE TO THE RELATED APPLICATION

This application claims priority from Korean Patent Application No. 10-2016-0092889, filed on Jul. 21, 2016, in the Korean Intellectual Property Office, the disclosure of which is incorporated herein in its entirety by reference.

BACKGROUND

1. Field

Apparatuses and methods consistent with exemplary embodiments relate to providing surveillance data, and more particularly, to providing surveillance data by analyzing and learning time-based patterns of image data and sound data obtained from a surveillance zone and determining priorities of events included in a list to be provided to a user by considering learning results.

2. Description of the Related Art

Surveillance systems receive image data and sound data from devices photographing surveillance zones and analyze the image data and the sound data to determine whether abnormal situations have occurred. If any abnormal situation has occurred, the surveillance systems may provide various contents to users.

Most surveillance systems use only references set by users to determine occurrence of abnormal situations, but do not use other references that are not set by users.

Such surveillance systems of the related art are useful in terms of providing results according to user's requests. However, the surveillance systems of the related art may not function properly in the case of abnormal situations that users cannot perceive or have not predicted.

SUMMARY

One or more exemplary embodiments of the inventive concept include a system and method for providing surveillance data by learning surrounding situations and setting a reference for determining abnormal situations according to the results of the learning.

Various aspects of the inventive concept will be set forth in part in the description which follows and, in part, will be apparent from the description, or may be learned by practice of the presented exemplary embodiments.

According to one or more exemplary embodiments, there is provided a system for providing surveillance data which may include: a pattern learner configured to learn a time-based data pattern by analyzing at least one of image data of one or more images and sound data of sound obtained from a surveillance zone at a predetermined time or time period, and to generate an event model based on the time-based data pattern; and an event detector configured to detect at least one event by comparing the event model with a time-based data pattern of at least one of first image data of one or more first images and first sound data of first sound obtained from the surveillance zone.

The pattern learner may include: a first learner configured to calculate a statistical data value of at least one of a color, a number of at least one object detected in the surveillance zone, and a degree of movement of the detected at least one object from the one or more images; and a second learner configured to calculate a statistical data value of at least one sound level from the sound, wherein the time-based data pattern corresponds to a time-based variation in the statistical value calculated by the first learner or the second learner.

The pattern learner may generate the event model based on the image data and the sound data corresponding to a first average value, of the at least one of the color, the number of the at least one object, and the degree of movement, and a second average value of the at least one sound level, calculated by the first learner and the second learner, respectively, and in response to a value of the first image data or a value of the first sound data being identical to or greater than the first average value or the second average value, respectively, the event detector may determine that the at least one event has occurred.

The event detector may detect the at lease one event from the first image data and the first sound data by considering daily data variation patterns of the image data and the sound data, and when the first image data and the first sound data do not correspond to the daily data variation patterns, the event detector may determine that the at least one event has occurred.

The pattern learner may determine a moving path of an object, detected in the surveillance zone, based on image data obtained from a plurality of cameras photographing the surveillance zone, and the pattern learner may generate the event model by additionally considering a time-based data pattern of the moving path.

The event detector may assign priorities to the detected at least one event including a plurality of events, and the system may further include an event output interface which generates an event list of the detected events.

The event detector may assign the priorities, different from one another, to the detected events based on an amount of difference between the event model and the time-based data pattern.

The system may further include or be connected to a database storing the first image data and the first sound data, and the pattern learner may receive a user's search request and update the event model according to the user's search request.

According to one or more exemplary embodiments, there is provided a method of providing surveillance data. The method may include: learning a time-based data pattern by analyzing at least one of image data of one or more images and sound data of sound obtained from a surveillance zone at a predetermined time or time period, and to generate an event model based on the time-based data pattern; and detecting at least one event by comparing the event model with a time-based data pattern of at least one of first image data of one or more first images and first sound data of first sound obtained from the surveillance zone.

The learning the time-based data pattern may include: performing a first learning operation to calculate a statistical data value of at least one of a color, a number of at least one object detected in the surveillance zone, and a degree of movement of the detected at least one object from the one or more images; and performing a second learning operation to calculate a statistical data value of at least one sound level from the sound, wherein the time-based data pattern corresponds to a time-based variation in the statistical value calculated by the first learner or the second learner.

In the learning the time-based data pattern, the event model may be generated based on the image data and the sound data corresponding to a first average value, of the at least one of the color, the number of the at least one object, and the degree of movement, and a second average value of the at least one sound level, calculated through the first learning operation and the second learning operation, and, and in the detecting the at least one event, it may be determined that the at least one event has occurred, in response to a value of the first image data or a value of the first sound data being identical to or greater than the first average value or the second average value, respectively.

In the detecting the at least one event, the at least one event may be detected from the first image data and the first sound data by considering daily data variation patterns of the image data and the sound data, wherein when the first image data and the first sound data do not correspond to the daily data variation patterns, it may be determined that the at least one event has occurred.

The method may further include determining a moving path of an object, detected in the surveillance zone, based on image data obtained from a plurality of cameras photographing the surveillance zone, and the event model may be generated by additionally based on a time-based data pattern of the moving path.

The method may further include: assigning priorities to the detected at least one event including a plurality of events; and generating an event list of the detected events.

The assigning the priorities may be assigning the priorities, different from one another, to the detected events based on an amount of difference between the event model and the time-based data pattern.

The method may further include: storing the first image data and the first sound data in a database; and receiving a user's search request and updating the event model according to the user's search request.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION

Figure 1:
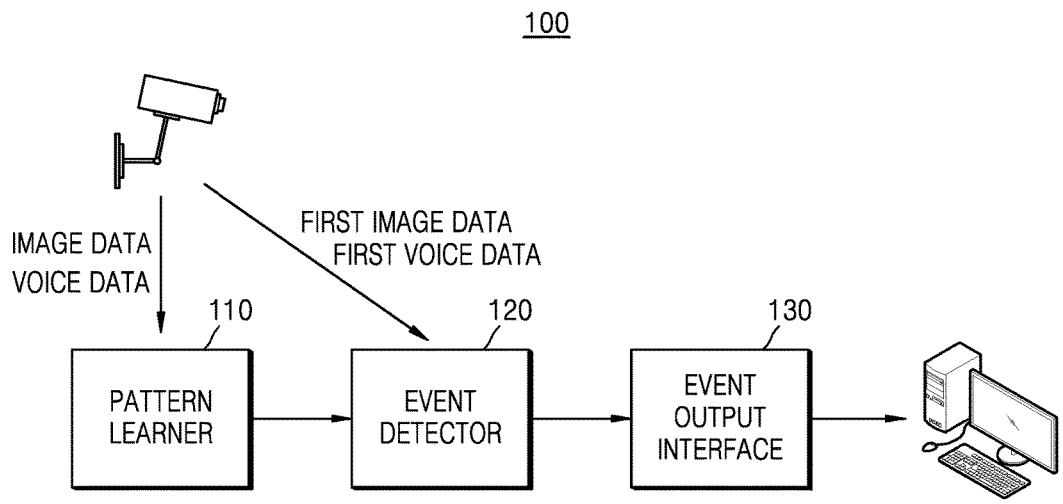
FIG. 1 is a schematic view illustrating a surveillance data providing system, according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the drawings, to explain various aspects of the inventive concept. As used herein, the term "and/or" includes any and all combinations of one or more of the associated listed items.

Hereinafter, the exemplary embodiments will be described with reference to the accompanying drawings. In the drawings, like reference numerals denote like elements, and overlapping descriptions thereof will be omitted.

In the following description, the technical terms are used only for explaining one or more exemplary embodiments while not limiting the inventive concept. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof. It will be understood that although the terms "first" and "second" are used herein to describe various elements, these elements should not be limited by these terms. Terms are only used to distinguish one element from other elements.

FIG. 1 is a schematic view illustrating a surveillance data providing system 100, according to an exemplary embodiment.

Referring to FIG. 1, the surveillance data providing system 100 of the exemplary embodiment includes a pattern learner 110, an event detector 120, and an event output interface 130. The pattern learner 110 and the event detector 120 may obtain image data and sound data from a surveillance zone via a surveillance camera installed in the surveillance zone. Hereinafter, the terms "image data" and "sound data" may refer to one or more "images" and "sound" which are the bases of the image data and the sound data.

In FIG. 1, one surveillance camera is illustrated. However, the inventive concept is not limited thereto. The surveillance data providing system 100 of the exemplary embodiment may obtain image data and sound data received from or via a plurality of surveillance cameras, and may simultaneously individually process the image data and the sound data.

The pattern learner 110 may analyze the image data and the sound data obtained from the surveillance zone to learn data patterns according to time and generate an event model according to the time-based data patterns.

The time-based data patterns refer to characteristics of the image data and the sound data of the surveillance zone according to time. The number of objects in the image data and/or an average color of the image data that are measured or calculated according to time may be the time-based data pattern of the image data. In addition, loudness or a sound level of the sound data according to time may be the time-based data pattern of the sound data.

The pattern learner 110 may continually receive image data and sound data of the surveillance zone and may determine a general pattern of situations in the surveillance zone by analyzing and learning patterns of the data.

For example, statistical data values of the number of objects detected in the surveillance zone at a particular time or time period, e.g., from 10 AM to 11 AM, may be analyzed using image data obtained from the surveillance zone for one month, and statistical data values of a noise level of the surveillance zone at a particular time or time period, e.g., from 10 AM to 11 AM may be analyzed using sound data obtained from the surveillance zone for one month.

The pattern learner 110 may determine a time-based object detection trend and a time-based noise generation trend in the surveillance zone based on the statistical data values, and may generate an event model of the surveillance zone according to time by using average data values of the image data and the sound data.

The event model may be generated using average data values of the image data and the sound data obtained from the surveillance zone. For example, the event model may include the number of objects detected in the surveillance zone for one hour from 10 AM, an average color of the image data for one hour from 10 AM, and/or an average degree of movement of the objects. Similarly, the event model may include the average value of noise levels of the surveillance zone measured for one hour from 10 AM.

Therefore, it may be understood that the event model includes time-based average data values of image data and sound data obtained from the surveillance zone.

The event detector 120 may detect events by comparing the event model generated by the pattern learner in the above manner with time-based data patterns of first image data and first sound data that the event detector 120 obtains from the surveillance zone, and assign priorities to the detected events.

It may be understood that an event having a high priority may be or may include first image data and/or first sound data, obtained by the event detector 120, largely deviating from statistical average data values of the image data and/or the sound data of or corresponding to the event model.

The event models may be generated according to time, that is, a plurality of event models may be generated, and first image data and first sound data, obtained by the event detector 120, corresponding to each time period may be compared with an image data pattern and a sound data pattern constituting the event model.

If comparison results show that the pattern of the first image data deviates from the image data pattern constituting the event model by a reference amount or greater, it may be determined that the first image data includes an event to be reported to a user. In this case, as the deviation becomes greater than the reference amount, the priority of the event may be higher.

Similarly, if the comparison results show that the pattern of the first sound data deviates from the sound data pattern constituting the event model by a reference amount or greater, it may be determined that the first sound data includes an event to be reported to a user. As the deviation becomes greater than the reference amount, the priority of the event may be higher.

The event output interface 130 outputs a list of the detected events according to the priorities of the events. An event having the highest priority may be at the first position in the list, and after receiving the list, a user may determine an event to be first checked according to the order in the list.

The events may be presented in the list in the order of the priorities assigned to the events or may be presented as icons or thumbnails having sizes corresponding to the priorities of the events.

Figure 2:
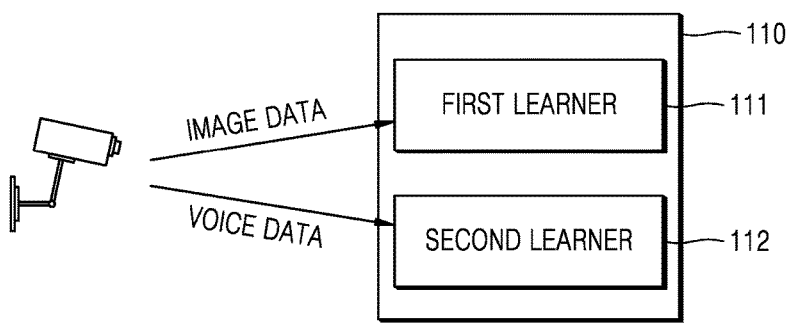
FIG. 2 is a schematic view illustrating a pattern learner, according to an exemplary embodiment.

FIG. 2 is a schematic view illustrating the pattern learner 110, according to an exemplary embodiment.

Referring to FIG. 2, the pattern learner 110 of the exemplary embodiment may include a first learner 111 and a second learner 112. The first learner 111 may calculate statistical data values of an average color of image data, the number of objects detected in the image data, and a degree of movement of the detected objects.

As described with reference to FIG. 1, the pattern learner 110 may learn time-based data patterns by analyzing image data and sound data obtained from the surveillance zone.

The first learner 111 is a module configured to learn a time-based data pattern of the image data. The first learner 111 may calculate statistical data values of a time-based variation pattern of the average color of the image data, the number of objects detected in the image data in each time period, a time-based variation pattern of the number of the detected objects, and/or a time-based variation pattern of the degree of movement of the detected objects.

For example, the first learner 111 may calculate the average color of image data obtained from the surveillance zone from 3 AM for 10 minutes or may calculate the number of objects detected in the image data during the 10-minute period.

In addition, the image data obtained from 3 AM may be divided at intervals of 10 minutes, and statistical data values about the average color of the image data, the number of objects detected in the image data, and the degree of movement of the detected objects may be calculated in each 10-minute internal.

In the above, the time "3 AM" and the time interval "10 minutes" are examples for explaining the exemplary embodiment, and the inventive concept is not limited thereto. That is, the image data may be obtained using the surveillance camera operating 24 hours a day, and the first learner 111 may divide the image data at preset time intervals to analyze a time-based image data pattern and learn analyzed results.

In addition, the first learner 111 may learn various data characteristics extracted from the image data in addition to the above-described average color of the image data in each time period and the number of objects in the image data in each time period.

For example, the first learner 111 may assign unique identifications (IDs) to objects detected in the image data, and may detect moving paths of the objects using the IDs.

In addition, the IDs of objects detected in each time period or each day of the week may be analyzed, and a set of IDs of objects detected in each time period may be set as an event model.

The second learner 112 is a module configured to learn a time-based data pattern of the sound data. The second learner 112 calculates statistical data values about loudness from the sound data. In this case, loudness may be calculated in decibels (dB).

For example, the second learner 112 may determine loudness of sound data obtained from the surveillance zone for 10 minutes from 3 AM, and may calculate statistical data values about the loudness of the surveillance zone for the 10-minute period based on the determination. In addition, the image data obtained from 3 AM may be divided at intervals of 10 minutes to determine loudness in each 10-minute interval.

In this case, the time "3 AM" and the time interval "10 minutes" are examples for explaining the exemplary embodiment, and the inventive concept is not limited thereto. That is, the sound data may be obtained using the surveillance camera operating 24 hours a day, and the second learner 112 may divide the sound data at preset time intervals to analyze a time-based sound data pattern and learn analyzed results.

In addition, the second learner 112 may learn various sound characteristics from the sound data in addition to the above-described loudness. For example, the second learner 112 may learn frequency characteristics of sound and sound types in each time period from the sound data.

Then, an event model may be generated based on learned information.

In addition, the pattern learner 110 may generate an event model based on image data and sound data corresponding to average values calculated using the first learner 111 and the second learner 112.

The event model may be generated using average values of image data and sound data obtained from the surveillance zone. For example, the even model may include the number of objects detected in the surveillance zone for 10 minutes from 3 AM, the average color of the image data, and/or the average degree of movement of the objects. Similarly, the event model may include the average value of noise levels of the surveillance zone measured from 3 AM for one hour.

Therefore, it may be understood that the even model includes time-based average data values of image data and sound data obtained from the surveillance zone.

For example, the average number of objects detected in image data obtained from the surveillance zone for one hour from 3 AM may be two, and the average of loudness detected from sound data obtained from the surveillance zone in the same time period is 40 dB. In this case, it may be understood that an event model for the surveillance zone from 3 AM for a time period of one hour includes two objects and a loudness of 40 dB. That is, a plurality of event models may be generated based on time periods.

In addition, as described with reference to FIG. 1, the event detector 120 compares the event model with first image data and first sound data. The first image data and the first sound data respectively refer to image data and sound data obtained from the surveillance zone after the event model is generated.

Even after the event model is generated, image data and sound data are continually obtained using the surveillance camera installed in the surveillance zone, and the event detector 120 may compare the event model with first image data and first sound data that the event detector 120 obtains so as to determine whether abnormal situations occur after the event model is generated.

In addition, as described above, a plurality of event models may be generated based on time periods. Thus, the event detector 120 may compare an event model with first image data and first sound data that are obtained in a time period corresponding to the event model so as to determine the occurrence of an event.

For example, an event model generated based on image data and sound data obtained for 10 minutes from 3 AM may be compared with first image data and first sound data obtained for 10 minutes from 3 AM after the event model is generated.

For example, the event detector 120 may compare a data pattern of image data, based on which an event model is generated, with a data pattern of first image data. If the data pattern of the first image data deviates from the data pattern of the image data, the event detector 120 may determine that an event has occurred.

For example, if the average color of image data based on which an event model is generated is a gray level of 120, and first image data has a gray level of 150, the event detector 120 may determine that an event has occurred in the surveillance zone. In this case, the event detector 120 may compare the event model with first image data obtained in real time, so as to determine occurrence of an event in the surveillance zone in real time.

In addition, if the average loudness of sound data based on which an event model is generated is 40 dB, and the average loudness of first sound data is 60 dB, the event detector 120 may determine that an event has occurred in the surveillance zone. In this case, the event detector 120 may compare the event model with first sound data obtained in real time, so as to determine occurrence of an event in the surveillance zone in real time.

In the above-described examples, data patterns of first image data and first sound data are greater than statistical data values of image data and sound data based on which an event model is generated. However, the inventive concept is not limited thereto. For example, it may be determined that an even has occurred in the surveillance zone even when data patterns detected from first image data and first sound data are less than statistical data values of image data and sound data based on which an event model is generated.

Figure 3A:
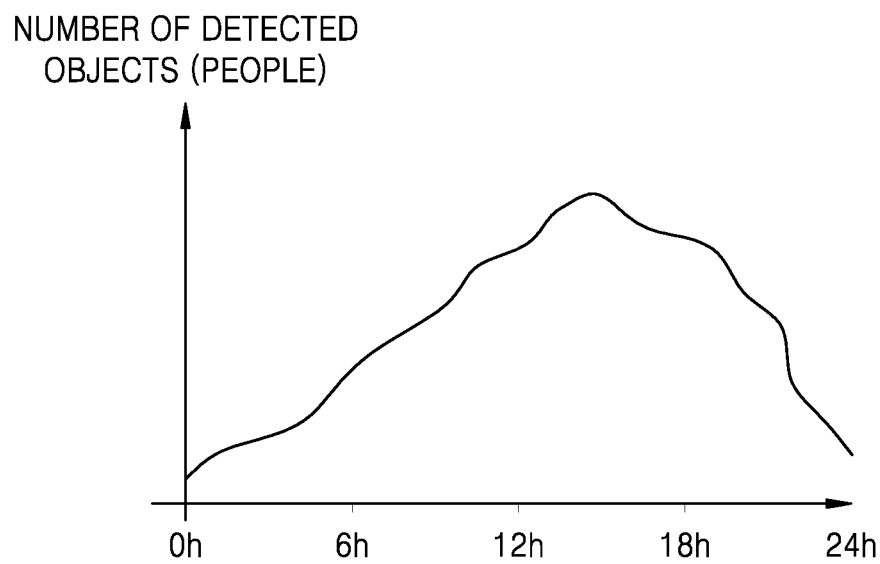
FIGS. 3A and 3B are graphs illustrating exemplary event models according to data pattern variations, according to an exemplary embodiment.
Figure 3B:
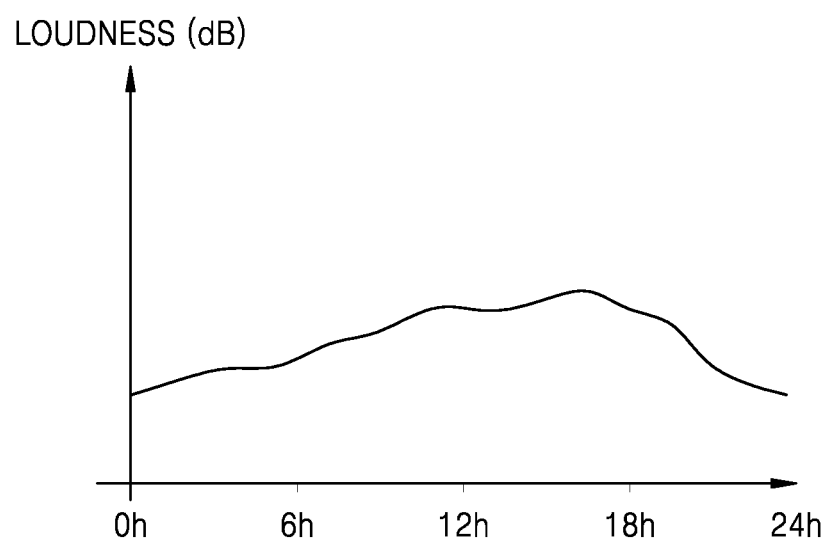

FIGS. 3A and 3B are graphs illustrating example event models according to data pattern variations, according to an exemplary embodiment.

FIG. 3A illustrates the number of objects detected in image data obtained from a surveillance zone, and FIG. 3B illustrates the loudness of sound data obtained from the surveillance zone. The graphs illustrated in FIGS. 3A and 3B are examples for explaining the inventive concept, and the inventive concept is not limited thereto.

In each of the graphs illustrated in FIGS. 3A and 3B, the horizontal axis refers to a time span of 24 hours from midnight, and variations in data during the time span are illustrated. The graphs of FIGS. 3A and 3B do not correspond to a particular day of the week or a particular date. The graphs of FIGS. 3A and 3B may present data obtained on different days.

Alternatively, the graphs may present average data variation patterns of image data and sound data obtained from the surveillance zone for a week. Therefore, if image data or sound data that does not correspond to the data variation patterns is detected from the surveillance zone, it may be determined that an event broke out at a time of inconsistency.

The time span during which the data variation patterns are obtained may be sufficiently long for determining the occurrence of an event. The time span may be a week as described above, or may be a month or three months.

First, referring to FIG. 3A, the number of objects detected in the surveillance zone increases gradually from midnight and reaches the maximum at about 3 PM. Referring to FIG. 3B, the variation pattern of loudness in the surveillance zone may be checked.

The graphs of FIGS. 3A and 3B may independently represent event models. The event detector 120 described with reference to FIGS. 1 and 2 may set the graphs of FIGS. 3A and 3B as an event model and may compare first image data and first sound data with the event model to determine occurrence of an event.

The surveillance data providing system 100 of the exemplary embodiment determines occurrence of events by taking time-based data patterns into consideration, and provides a list of the detected events according to the priorities of the events.

When time-based data patterns are analyzed, time may be divided into as short time periods as possible or may be designated at a particular time point, and an event model may be generated in each time period or at the particular time point. In this case, however, there may be no continuity between event models in neighboring time periods or time points.

However, the data patterns of first image data and first sound data may vary with time. Due to this, the event model may be generated in such a manner that the event model includes a data pattern having a continuous stream of data.

The event model may be generated in the form of graphs shown in FIGS. 3A and 3B, and the data variation patterns of first image data and first sound data may also be generated in the form of graphs shown in FIGS. 3A and 3B, so as to compare the data variation patterns with the event model. Then, if a time point at which data does not correspond to the data variation pattern of the event model is detected, it may be determined that an event has occurred at the time point.

In this case, correspondence to the data variation pattern of the event model does not mean that the graphs of the event model are exactly consistent with the first image data and the first sound data.

That is, if a time point at which data deviates out of a preset error range is detected, it may be determined that an event has occurred at the time point. In addition, a priority may be assigned to the event according to the degree of deviation of the data from the present error range.

Figure 4:
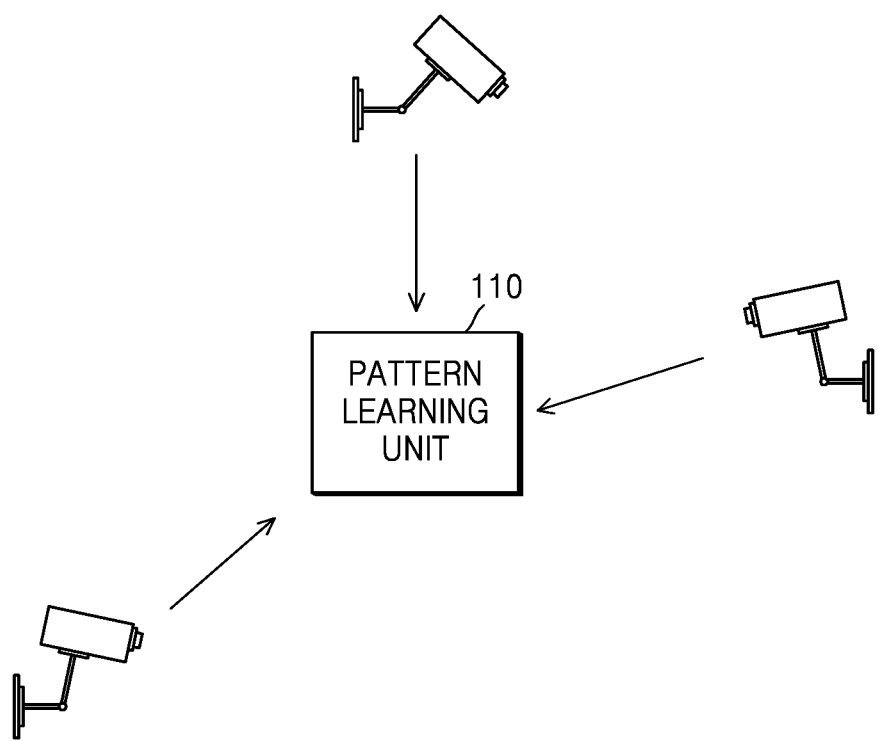
FIG. 4 is a schematic view illustrating a configuration for analyzing image data patterns by using a plurality of surveillance cameras, according to an exemplary embodiment.

FIG. 4 is a schematic view illustrating a configuration for analyzing an image data pattern by using a plurality of surveillance cameras, according to an exemplary embodiment.

As described with reference to FIG. 1, the surveillance data providing system 100 of the exemplary embodiment may obtain image data and sound data using a plurality of surveillance cameras, and may simultaneously individually process the image data and the sound data.

In this case, the pattern learner 110 may determine moving paths of objects based on image data obtained using the plurality of surveillance cameras photographing a surveillance zone, and may generate an event model by taking time-based data patterns of the moving paths.

The plurality of surveillance cameras illustrated in FIG. 4 may take images at different positions of the surveillance zone, and the images taken by the plurality of surveillance cameras may not overlap each other.

The pattern learner 110 may obtain image data from the plurality of surveillance cameras, and may detect objects from each piece of the image data provided by each of the plurality of surveillance cameras. In this case, if the same object is detected from a plurality of pieces of the image data, the pattern learner 110 may detect the moving path of the object.

For example, when a first object is detected from all of first image data to third image data, there may be time intervals between detections of the first object in the first image data, the second image data, and the third image data.

For example, the pattern learner 110 may analyze the moving path of the first object, and may determine that the first object has moved from a photographing position of a first surveillance camera used to obtain the first image data to a photographing position of a second surveillance camera used to obtain the second image data and then to a photographing position of a third surveillance camera used to obtain the third image data.

In this case, the moving path may be understood as an average (general) moving path of the first object in the surveillance zone. The pattern learner 110 may determine the moving path as an event model of the first object.

If the first object is detected again in the surveillance zone, the event detector 120 may compare a moving path of the first object with the event model corresponding to the average moving path of the first object so as to determine the occurrence of an event.

Figure 5:
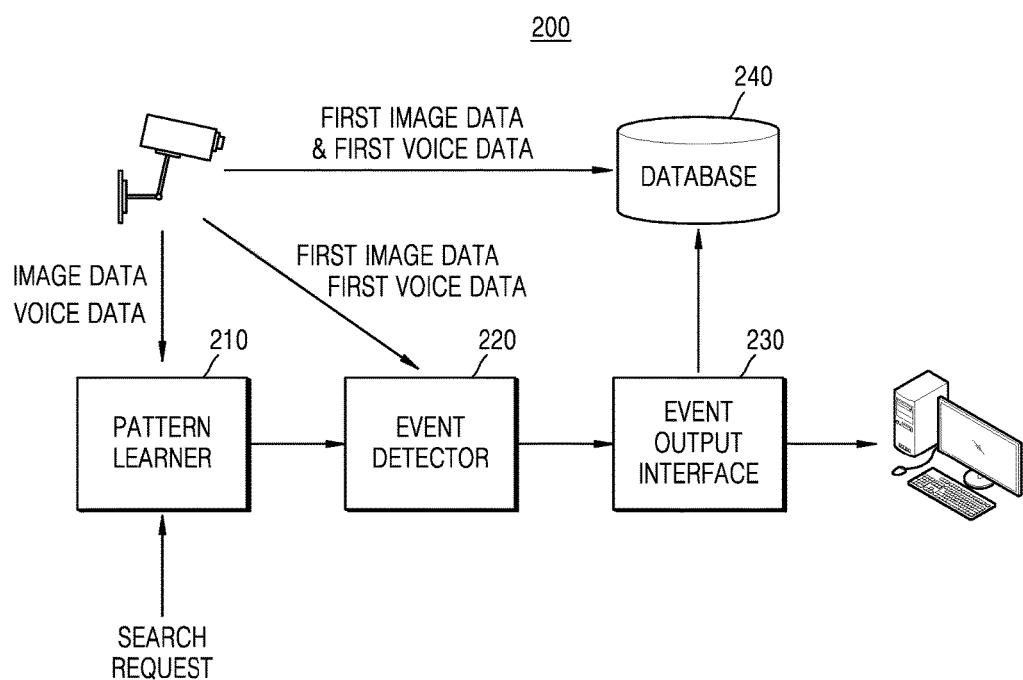
FIG. 5 is a schematic view illustrating a surveillance data providing system, according to another exemplary embodiment.

FIG. 5 is a schematic view illustrating a surveillance data providing system 200, according to another exemplary embodiment.

Referring to FIG. 5, the surveillance data providing system 200 of the other exemplary embodiment includes a pattern learner 210, an event detector 220, an event output interface 230, and a database 240.

The pattern learner 210, the event detector 220, and the event output interface 230 have substantially the same functions as the pattern learner 110, the event detector 120, and the event output interface 130 described with reference to FIGS. 1 and 2, and thus repeated descriptions thereof will not be presented here.

The database 240 stores first image data and first sound data. As described with reference to FIG. 2, the first image data and the first sound data are image data and sound data obtained by the event detector 220 from a surveillance zone after the pattern learner 210 generates an event model.

The pattern learner 210 receives a search request from a user and updates the event model. According to a time and data characteristics included in the search request, the pattern learner 210 may newly generate an event model having data characteristics in a corresponding time period. The newly generated event model and the existing event model may be included in a new event model.

As described with reference to FIGS. 1 and 2, the event model is a reference for determining occurrence of events. The surveillance data providing system 100 described with reference to FIG. 1 determines occurrence of events based on patterns of image data and sound data obtained from a surveillance zone.

The surveillance data providing system 200 illustrated in FIG. 5 updates the event model based on image data and sound data by taking a user's search request into consideration.

Even when an event model is generated by analyzing data obtained for a sufficient time period, a situation that a user considers as an event may not be detected as an event. In addition, a user may check a particular situation or may check a situation at a particular time by inputting data characteristics of the situation that the user wants to check.

In this case, the user's search request may relate to time or data characteristics, and the pattern learner 210 may update the event model by taking the user's search request into consideration.

For example, if a user inputs a search request to check situations in 10-minute periods before and after 10 PM, the pattern learner 210 may add 10-minute periods before and after 10 PM to the event model.

However, the update of the event model reflecting a user's search request may be performed only when the same search request or similar search requests are input a predetermined number of times or more.

If the event model is updated in response to a one-time search request, an unimportant situation may be determined as an event, and data may not be smoothly provided for a relatively important situation.

The event output interface 230 searches the database 240 for data corresponding to the search request. Since the first image data and the first sound data are stored in the database 240, the event output interface 230 searches the first image data and the first sound data stored in the database 240 for data corresponding to the search request. Then, the event output interface 230 adds found data corresponding to the search request to an event list.

The event list includes a detected event corresponding to the event model generated by the pattern learner 210, and as described with reference to FIGS. 1 and 2, the event list may be a list of events detected by comparing the data pattern of the event model with the first image data and the first sound data.

In addition, the surveillance data providing system 200 illustrated in FIG. 5 may provide an event list including results of comparison with the event model and results of data search corresponding to the search request.

That is, a user using the surveillance data providing system 200 may input a search request corresponding to a particular situation that the user wants to check, and for example, the search request may correspond to the number of detected objects or the loudness of sound.

Therefore, if it is intended to search for a situation in which loud sounds are generated at dawn, a search time and a search degree of loudness may be input as a search request, and then the event output interface 230 may search the first image data and the first sound data stored in the database 240 in response to the search request.

The pattern learner 210 may include an image learner (not shown) and a sound learner (not shown). The image learner may calculate statistical data values of the average color of image data, the number of objects detected in the image data, and the degree of movement of the detected objects, and the sound module may calculate statistical data values of loudness of sound data. In addition, the pattern learner 210 may determine a data pattern corresponding to variations in time periods in the statistical data values calculated by the image learner and the sound learner.

Figure 6:
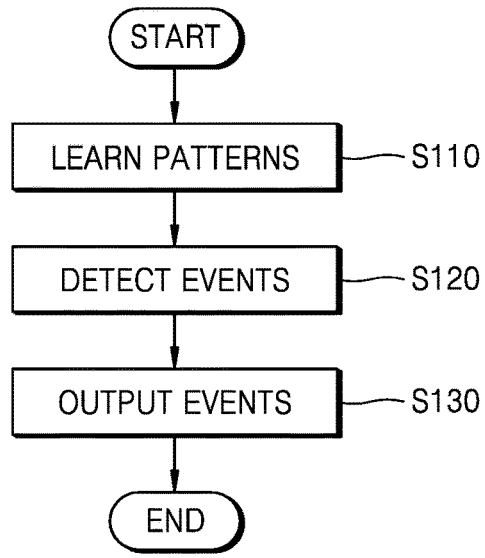
FIG. 6 is a schematic flowchart illustrating a surveillance data providing method, according to an exemplary embodiment.

FIG. 6 is a schematic flowchart illustrating a surveillance data providing method, according to an exemplary embodiment.

Referring to FIG. 6, the surveillance data providing method of the exemplary embodiment includes a pattern learning operation S110, an event detecting operation S120, and an event output operation S130.

In the pattern learning operation S110, image data and sound data obtained from a surveillance zone is analyzed to learn data patterns according to time, and an event model is generated according to the time-based data patterns.

The time-based data patterns refer to time-based characteristics of the image data and the sound data obtained from the surveillance zone. The number of objects detected in the image data in each of the time periods and/or average colors of the image data in the time periods may be the time-based data pattern of the image data. In addition, loudness in each time period may be the time-based data pattern of the sound data.

In the pattern learning operation S110, image data and sound data may be continually obtained from the surveillance zone, and a general pattern of situations in the surveillance zone may be determined by analyzing and learning patterns of the data.

For example, statistical values about the number of objects in the surveillance zone from 10 AM to 11 AM may be analyzed using image data obtained from the surveillance zone for one month, and statistical values about the noise level of the surveillance zone from 10 AM to 11 AM may be analyzed using sound data obtained from the surveillance zone for one month.

Furthermore, in the pattern learning operation S110, a time-based object detection trend and a time-based noise generation trend in the surveillance zone may be determined based on the statistical values, and a time-based event model of the surveillance zone may be generated by using average values of the image data and the sound data.

The event model may be generated using average values of the image data and the sound data obtained from the surveillance zone. For example, the event model may include the number of objects detected in the surveillance zone for one hour from 10 AM, the average color of the image data for one hour from 10 AM, and/or the average degree of movement of the objects. Similarly, the event model may include the average of noise levels of the surveillance zone measured for one hour from 10 AM.

Therefore, it may be understood that the even model includes time-based average data values of image data and sound data obtained from the surveillance zone.

In the event detecting operation S120, the event model is compared with time-based data patterns of first image data and first sound data obtained from the surveillance zone so as to detect events, and priorities are assigned to the detected events.

It may be understood that an event having a high priority includes first image data and/or first sound data largely deviating from statistical average values of image data and/or sound data corresponding to the event model.

The event model may be generated according to time, that is, a plurality of event models may be generated, and first image data and first sound data corresponding to each time period may be compared with an image data pattern and a sound data pattern constituting the event model.

If comparison results show that the pattern of the first image data deviates from the image data pattern constituting the event model by a reference amount or greater, it may be determined that the first image data includes an event to be reported to a user. In this case, as the deviation becomes greater than the reference amount, the priority of the event may become higher.

Similarly, if the comparison results show that the pattern of the first sound data deviates from the sound data pattern constituting the event model by a reference amount or greater, it may be determined that the first sound data includes an event to be reported to a user. As the deviation becomes greater than the reference amount, the priority of the event may become higher.

In the event output operation S130, a list of the detected events is output according to the priorities of the detected events. An event having the highest priority may be at the first position in the list, and after receiving the list, a user may determine an event to be first checked according to the order in the list.

The detected events may be presented in the list in the order of the priorities of the events or may be presented as icons or thumbnails having sizes corresponding to the priorities of the events.

Furthermore, in the event detecting operation S120, events may be detected from the first image data and the first sound data by considering daily data variation patterns of the image data and the sound data.

In the pattern learning operation S110, variation patterns of the image data and the sound data may be detected in the form of the graphs described with reference to FIGS. 3A and 3B. The variation patterns may constitute the event model, and in the event detecting operation S120, it may be determined that an event occurred if the first image data and the first sound data are not consistent with the event model, that is, the data variation patterns.

When time-based data patterns are analyzed, time may be divided into as short time periods as possible or may be designated at a particular time point, and an event model may be generated in each time period or at the particular time point. In this case, however, there may be no continuity between event models in neighboring time periods or time points.

However, the data patterns of the first image data and the first sound data may vary with time, and thus the event model may be generated in such a manner that the event model includes a data pattern having a continuous stream of data.

The data variation patterns shown in the graphs of FIGS. 3A and 3B may be used to consider continuous variations of data when detecting events.

Furthermore, in the pattern learning operation S110, as illustrated in FIG. 4, moving paths of objects may be determined based on image data obtained using a plurality of surveillance cameras photographing the surveillance zone, and an event model may be generated by considering time-based data patterns of the moving paths.

For example, when a first object is detected from all of first image data to third image data, there may be time intervals between detections of the first object in the first image data, the second image data, and the third image data.

For example, in the pattern learning operation S110, the moving path of the first object may be analyzed, and it may be determined that the first object has moved from a photographing position of a first surveillance camera used to obtain the first image data to a photographing position of a second surveillance camera used to obtain the second image data and then to a photographing position of a third surveillance camera used to obtain the third image data.

In this case, the moving path may be understood as an average (general) moving path of the first object in the surveillance zone. In the pattern learning operation S110, the moving path may be determined as an event model of the first object.

In the event detecting operation S120, if the first object is detected again in the surveillance zone, a moving path of the first object may be compared with the event model corresponding to the average moving path of the first object to determine the occurrence of an event.

Figure 7:
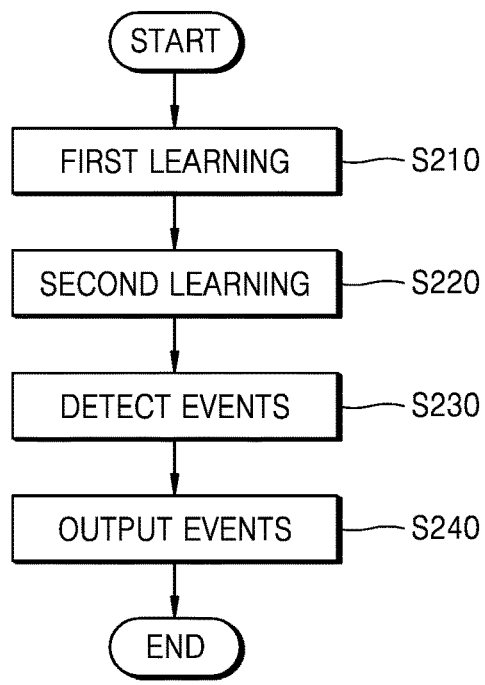
FIG. 7 is a schematic flowchart illustrating a surveillance data providing method, according to another exemplary embodiment.

FIG. 7 is a schematic flowchart illustrating a surveillance data providing method, according to another exemplary embodiment.

Referring to FIG. 7, the surveillance data providing method of the other exemplary embodiment includes a first pattern learning operation S210, a second pattern learning operation S220, an event detecting operation S230, and an event output operation S240.

The event detecting operation S230 and the event output operation S240 are substantially the same as the event detecting operation S120 and the event output operation S130 described with reference to FIG. 6, and thus repeated descriptions thereof will not be presented here.

In the first pattern learning operation S210, a time-based data pattern of the image data is learned, and statistical data values of a time-based variation pattern of an average color of the image data, the number of objects detected in the image data in each time period, a time-based variation pattern of the number of the detected objects, and/or a time-based variation pattern of a degree of movement of the detected objects are calculated.

For example, in the first pattern learning operation S210, the average color of image data obtained from a surveillance zone from 3 AM for 10 minutes may be calculated, or the number of objects detected in the image data during the 10-minute period may be calculated.

In addition, image data obtained from 3 AM may be divided at intervals of 10 minutes, and statistical data values about the average color of the image data, the number of objects detected in the image data, and the degree of movement of the detected objects may be calculated in each 10-minute internal.

In this case, the time "3 AM" and the time interval "10 minutes" are examples for explaining the exemplary embodiment, and the inventive concept is not limited thereto. That is, image data may be obtained using a surveillance camera operating 24 hours a day, and in the first pattern learning operation S210, the image data may be divided at preset time intervals to analyze a time-based image data pattern and learn analyzed results.

In the second pattern learning operation S220, a time-based data pattern of sound data is learned, and statistical data values about loudness of the sound data are calculated. In this case, loudness may be calculated in decibels (dB).

For example, in the second pattern learning operation S220, the loudness of sound data obtained from the surveillance zone for 10 minutes from 3 AM may be determined, and statistical data values about the loudness of the surveillance zone for the 10-minute period may be calculated based on the determination. In addition, image data obtained from 3 AM may be divided at intervals of 10 minutes to determine loudness in each 10-minute interval.

In this case, the time "3 AM" and the time interval "10 minutes" are examples for explaining the exemplary embodiment, and the inventive concept is not limited thereto. That is, sound data may be obtained using a surveillance camera operating 24 hours a day, and in the second pattern learning operation S220, the sound data may be divided at preset time intervals to analyze a time-based sound data pattern and learn analyzed results.

Figure 8:
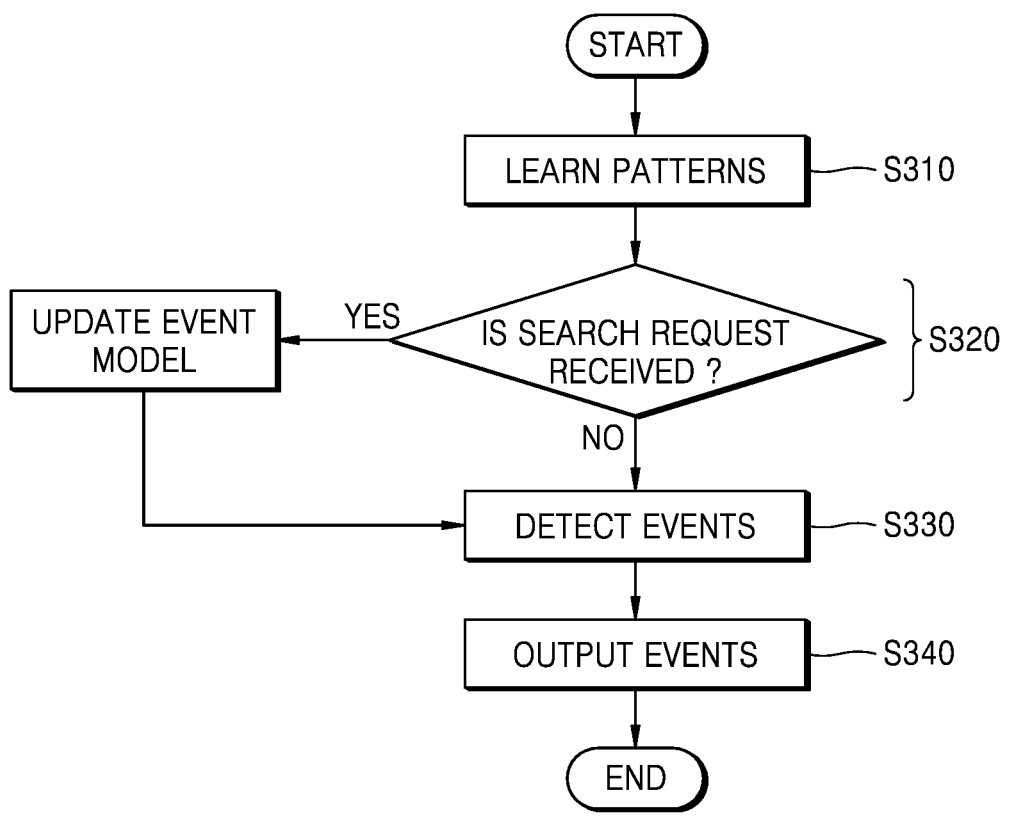
FIG. 8 is a schematic flowchart illustrating a surveillance data providing method, according to another exemplary embodiment.

FIG. 8 is a schematic flowchart illustrating a surveillance data providing method, according to another exemplary embodiment.

Referring to FIG. 8, the surveillance data providing method of the other exemplary embodiment includes a pattern learning operation S310, an event model update operation S320, an event detecting operation S330, and an event output operation S340. The pattern learning operation S310, the event detecting operation S330, and the event output operation S340 are respectively substantially the same as the pattern learning operation S110, the event detecting operation S120, and the event output operation S130 described with reference to FIG. 6, and thus, repeated descriptions thereof will not be presented.

In the event model update operation S320, an event model generated in the pattern learning operation S310 is updated in response to a search request received from a user. In the event model update operation S320, a time and data characteristics included in the search request may be considered, and an event model having the data characteristics in a corresponding time period may be newly generated. The newly generated event model and the existing event model may be included in a new event model.

As described with reference to the accompanying drawings, the event model is a reference for determining occurrence of one or more events. Even when an event model is generated by analyzing data obtained for a sufficient time period, a situation that a user considers as being an event may not be detected as an event. In addition, a user may check a particular situation or may check a situation at a particular time by inputting data characteristics of a situation that the user wants to check.

In this case, the user's search request may relate to time or data characteristics, and in the event model update operation S320, the event model may be updated by taking the user's search request into consideration.

First image data and first sound data may be stored in a storage device such as a database device, and in the event output operation S340, data corresponding to the user's search request may be searched for in the database device, and found data may be added to an event list.

In the above exemplary embodiments, both the image data and the sound data obtained from a surveillance zone are used to generate an event model, and both the first image data and the sound data are compared to the event model to determine occurrence of an event, the inventive concept is not limited thereto. In other words, only the image data or the sound data may be used to generate an event model, and one first image data or the first sound data may be compared to the event model to determined occurrence of an event.

As described above, according to the above exemplary embodiments, the system and method for providing surveillance data are designed to learn surrounding situations and set a reference for determining abnormal situations according to learning results.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 1, 2 and 5 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. A processor included in a corresponding component, element, module or unit or configured to control the same may control at least one other component, element, module or unit depending on a system design. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the above exemplary embodiments have been described with reference to the drawings, it will be understood by those of ordinary skill in the art that various changes in form and details may be made therein without departing from the spirit and scope of the inventive concept as defined by the following claims.

What is claimed is:

1. A system for providing surveillance data comprising:
   a pattern learner, implemented by at least one processor, configured to learn a first time-based data pattern by analyzing at least one of image data of one or more images and sound data of sound obtained from a surveillance zone at a predetermined time or time period, and to generate an event model based on the first time-based data pattern; and
   an event detector, implemented by the at least one processor, configured to detect at least one event by comparing the event model with a second time-based data pattern of at least one of first image data of one or more first images and first sound data of first sound obtained from the surveillance zone,
   wherein the first time-based data pattern represents a time-based variation in the at least one of the image data and the sound data, and the event detector is configured to detect the at least one event in response to determining that at least one of the first image data and the first sound data deviates, out of a preset error range, from the time-based variation of the first time-based data pattern.

2. The system of claim 1, wherein the pattern learner comprises:
   a first learner configured to calculate a statistical data value of at least one of a color, a number of at least one object detected in the surveillance zone, and a degree of movement of the detected at least one object from the one or more images; and
   a second learner configured to calculate a statistical data value of at least one sound level from the sound,
   wherein the first time-based data pattern corresponds to a time-based variation in the statistical data value calculated by the first learner or the second learner.

3. The system of claim 2, wherein the pattern learner is configured to generate the event model based on the image data and the sound data corresponding to a first average value, of the at least one of the color, the number of the at least one object, and the degree of movement, and a second average value of the at least one sound level, calculated by the first learner and the second learner, respectively, and wherein, in response to a value of the first image data or a value of the first sound data being identical to or greater than the first average value or the second average value, respectively, the event detector is configured to determine that the at least one event has occurred.

4. The system of claim 1, wherein the event detector is configured to detect the at least one event from the first image data and the first sound data by considering daily data variation patterns of the image data and the sound data.

5. The system of claim 4, wherein in response to at least one of the first image data and the first sound data not corresponding to the daily data variation patterns, the event detector is configured to determine that the at least one event has occurred.

6. The system of claim 1, wherein the pattern learner is configured to determine a moving path of an object, detected in the surveillance zone, based on image data obtained from a plurality of cameras photographing the surveillance zone, and wherein the pattern learner is configured to generate the event model additionally based on a third time-based data pattern of the moving path.

7. The system of claim 1, wherein the event detector is further configured to assign priorities to the detected at least one event comprising a plurality of events, and wherein the system further comprises an event output interface configured to generate an event list of the plurality of events according to the assigned priorities.

8. The system of claim 7, wherein the event detector is further configured to assign the priorities, different from one another, to the plurality of events based on an amount of difference between the event model and the second time-based data pattern corresponding to each of the plurality of events.

9. The system of claim 1, wherein the system further comprises or is connected to a database storing the first image data and the first sound data, and wherein the pattern learner is configured to receive a user's search request and update the event model according to the user's search request.

10. The system of claim 9, wherein the event detector is further configured to assign priorities to the detected at least one event comprising a plurality of events, wherein the system further comprises an event output interface configured to generate an event list of the plurality of events, and wherein the event output interface is configured to search for data corresponding to the user's search request in the database and add the data to the event list.

11. A method of providing surveillance data, the method comprising:

learning a first time-based data pattern by analyzing at least one of image data of one or more images and sound data of sound obtained from a surveillance zone at a predetermined time or time period, and to generate an event model based on the first time-based data pattern; and detecting at least one event by comparing the event model with a second time-based data pattern of at least one of first image data of one or more first images and first sound data of first sound obtained from the surveillance zone, wherein the first time-based data pattern represents a time-based variation in the at least one of the image data and the sound data, and the detecting the at least one event comprises detecting the at least one event in response to determining that at least one of the first image data and the first sound data deviates, out of a preset error range, from the time-based variation of the first time-based data pattern.

12. The method of claim 11, wherein the learning the first time-based data pattern comprises:

performing a first learning operation to calculate a statistical data value of at least one of a color, a number of at least one object detected in the surveillance zone, and a degree of movement of the detected at least one object from the one or more images; and performing a second learning operation to calculate a statistical data value of at least one sound level from the sound, wherein the first time-based data pattern corresponds to a time-based variation in the statistical data value calculated in the first learning operation or the second learning operation.

13. The method of claim 12, wherein in the learning of the first time-based data pattern, the event model is generated based on the image data and the sound data corresponding to a first average value, of the at least one of the color, the number of the at least one object, and the degree of movement, and a second average value of the at least one sound level, calculated through the first learning operation and the second learning operation, and wherein in the detecting the at least one event, it is determined that the at least one event has occurred, in response to a value of the first image data or a value of the first sound data being identical to or greater than the first average value or the second average value, respectively.

14. The method of claim 11, wherein in the detecting the at least one event, the at least one event is detected from the first image data and the first sound data by considering daily data variation patterns of the image data and the sound data.

15. The method of claim 14, wherein the first image data and the first sound data not corresponding to the daily data variation patterns, it is determined that the at least one event has occurred.

16. The method of claim 11, further comprising determining a moving path of an object, detected in the surveillance zone, based on image data obtained from a plurality of cameras photographing the surveillance zone, wherein the event model is generated additionally based on a third time-based data pattern of the moving path.

17. The method of claim 11, further comprising:

assigning priorities to the detected at least one event comprising a plurality of events; and generating an event list of the plurality of events.

18. The method of claim 17, wherein the assigning the priorities comprises assigning the priorities, different from one another, to the plurality of events based on an amount of difference between the event model and the second time-based data pattern corresponding to each of the plurality of events.

19. The method of claim 11, further comprising:

storing the first image data and the first sound data in a database; and receiving a user's search request and updating the event model according to the user's search request.

20. The method of claim 19, further comprising:

assigning priorities to the detected at least one event comprising a plurality of events;

generating an event list of the plurality of events; and searching for data corresponding to the user's search request in the database and adding the data to the event list.

21. A system for providing surveillance data comprising:

a pattern learner, implemented by at least one processor, configured to learn a first time-based data pattern by analyzing at least one of image data of one or more images and sound data of sound obtained from a surveillance zone at a predetermined time or time period, and to generate an event model based on the first time-based data pattern; and an event detector, implemented by the at least one processor, configured to detect at least one event by comparing the event model with a second time-based data pattern of at least one of first image data of one or more first images and first sound data of first sound obtained from the surveillance zone, wherein the pattern learner is configured to obtain a statistical data value with respect to at least one of at least one object detected from the one or more images and at least one sound level from the sound, and the first time-based data pattern corresponds to a time-based variation in the statistical data value.

* * * * *